United States Patent [19]

Trent

[11] Patent Number: 5,453,786

[45] Date of Patent: Sep. 26, 1995

[54] METHOD AND APPARATUS FOR IMAGE DATA PROCESSING

[75] Inventor: Robert J. Trent, Coquitlam, Canada

[73] Assignee: MPR Teltech Ltd., Burnaby, Canada

[21] Appl. No.: 348,951

[22] Filed: Nov. 25, 1994

Related U.S. Application Data

[63] Continuation of Ser. No. 966,194, Jan. 29, 1993, abandoned.

[30] Foreign Application Priority Data

Jul. 30, 1990 [JP] Japan ........................ PCT/CA90/00244

[51] Int. Cl.$^6$ ........................... H04N 7/12; H04N 7/30
[52] U.S. Cl. ........................................ 348/384; 348/403
[58] Field of Search ........................ 348/384, 386, 348/387, 390, 403

[56] References Cited

U.S. PATENT DOCUMENTS

| | | | |
|---|---|---|---|
| 4,772,956 | 9/1988 | Roche et al. | |
| 4,774,587 | 9/1988 | Schmitt. | |
| 4,951,139 | 8/1990 | Hamilton et al. | 358/135 |
| 4,982,283 | 1/1991 | Acampara | 358/133 |
| 5,005,076 | 4/1991 | Stoppine et al. | 358/135 |
| 5,079,621 | 1/1992 | Daly et al. | 358/133 |

FOREIGN PATENT DOCUMENTS 0084270  7/1983  European Pat. Off. .

Primary Examiner—Tommy P. Chin
Assistant Examiner—Vu Le
Attorney, Agent, or Firm—Shlesinger, Arkwright & Garvey

[57] ABSTRACT

A method of processing digital image data such as obtained from a television screen for transmission along telephone lines such that the transmitted data can be transformed to produce images in color. The method includes storing a frame of incoming digital image data in a frame buffer, transferring a group of tiles from the frame buffer to a tile buffer, generating a clock signal, generating address and sets of control signals in a state machine, applying the clock signal to a digital transformer and applying each address and set of control signals to the tile buffer to directly transfer a block of data in the tile buffer to the digital transformer. Next the data in the block is transformed, returned to the tile buffer and is written over the corresponding untransformed data in the tile buffer. These steps are repeated until all tiles in the tile block have been transformed and returned. The transformed tiles in the tile block are then coded so as to complete their compression. The compression steps are repeated until all tiles in the frame buffer are compressed.

20 Claims, 5 Drawing Sheets

| ADDRESS BIT | 12 | 11 | 10 | 9 | 8 | 7 | 6 | 5 | 4 | 3 | 2 | 1 | 0 |
|---|---|---|---|---|---|---|---|---|---|---|---|---|---|
| FB TRANSFER | W | R | R | R | T | T | T | T | T | T | C | C | 0 |
| Y DCT TRANSFER | W | R | R | R | T | T | T | T | T | T | C | C | C |
| I DCT TRANSFER | W | R | R | R | T | T | T | T | T | C | C | C | C |
| Q DCT TRANSFER | W | R | R | R | T | T | T | T | T | C | C | C | 0 |
| INCREMENT PULSES | 6 | | | 5 | | | | 4 | 3 | 2 | | | 1 | 0 |

FIGURE 6

W = WRITE FIELD
R = ROW FIELD
T = TILE FIELD
C = COLUMN FIELD

METHOD AND APPARATUS FOR IMAGE DATA PROCESSING

This application is a continuation of application Ser. No. 07/966,194, filed Jan. 29, 1993 now abandoned.

BACKGROUND

The present invention relates to a method and apparatus for processing image data for transmission along telephone lines and for decoding the processed data after transmission such that the data can be transformed to produce color images of color television quality.

Known systems for transmitting image data along telephone lines are severely limited in the speed at which the data can be transmitted and reassembled at a receiving end. For example, a single frame of a color television quality image contains 512 by 512 by 24 bits and takes approximately 90 seconds to transmit without compression using a 64 kilobit per second standard ISDN B channel. One method to enhance transmission speed is to compress the data according to known transforms and then, after transmission, to decompress the compressed, transmitted data.

A television screen, for example, is divided up into a plurality of individual image units referred to as pixels. For colour images each pixel may contain three separate parameters such as red, green and blue. Each parameter may be defined as to intensity by an eight bit number called a byte. Thus, each pixel is defined by three bytes. In order to process the data efficiently it is useful to treat a block of 8 by 8 pixels known as a "tile". A known technique consists of directing a first tile of an image into a processor and then inputting the first tile into a digital transformer. The tile output modified by the transformer is sent back to the processor where it is further compressed and sent to an output port. The second tile in the image is then sent to the transformer. This process is repeated until all of the image tile have been processed. In such a system the requirement for numerous fetch and other instructions from the processor makes the process impractically slow. Thus, the advantages of transmission speed increase due to compression is offset by the time take to compress and decompress.

Accordingly, it is an object of the invention to provide an improved method of processing imaging data for compression and decompression. It is a further object of the invention to provide a buffer to receive and store data corresponding to an image and then to process the captured data.

SUMMARY OF THE INVENTION

According to the invention there is provided a method of processing digital image data such as obtained from a television screen for transmission along telephone lines in a way that the transmitted data can be transformed to produce images in colour. The method includes storing a frame of digital data in a frame buffer, transferring data from said frame buffer to a tile buffer, generating a clock signal, and generating sets of address and control signals in a state machine. The clock signal is applied to a digital transformer while the address and set of control signals are applied to the tile buffer to directly transfer data in the tile buffer to the digital transformer. After the data is transformed in the digital transformer it is returned to the tile buffer where it is used to overwrite the corresponding original data stored in the tile buffer. The latter process is followed by coding the transformed data stored in the tile buffer so as to compress them. The process is repeated until all data in the frame buffer has been compressed.

Preferably, the data is transferred directly to the tile buffer. The clock signal may have a frequency of greater than approximately one megahertz. Advantageously, the digital transforming step applies a discrete cosine transform while the coding is Huffman coding.

An improvement in speed is achieved by utilizing Y, I and Q parameters to define a pixel colour. By alternating I and Q data in each alternate pixel, a saving of ⅓ of the data required to describe the image is achieved without a significant loss of resolution or colour.

The compressing step may include sequentially transferring data in the form of tiles into a tile buffer and performing a discrete cosine transform on each of the tiles wherein each tile is composed of a matrix of 8 by 8 pixels and each pixel being characterized as to colour and intensity. The transformed tiles are then coded in accordance with Huffman Coding.

The tile pixels in the frame buffer are extracted row by row tile by tile until an entire row of tiles has been transferred. commencing from the first row and proceeding in sequence row by row until the last row has been extracted.

The video signals, if in analog form, are first digitized before storing them in the frame buffer. After compressing the data it is transferred to a communication output interface.

The method may also include reversing the order of processing to perform first inverse Huffman Coding on compressed data, followed by inverse Huffman Coding and then transferring the decompressed data to the frame buffer for further transfer to be transformed into analog video signals.

BRIEF DESCRIPTION OF THE DRAWINGS

The novel features believed characteristic of the invention are set forth in the appended claims. The invention itself, however, as well as other features and advantages thereof, will be best understood by reference to the detailed description which follow, read in conjunction with the accompanying drawings, wherein:

FIG. 6 is a table showing the structure of the address bits generated by the state machine which are used to transfer data between the frame buffer, the tile buffer and the discrete cosine transform (DCT)

DETAILED DESCRIPTION WITH REFERENCE TO THE DRAWINGS

Figure 1:
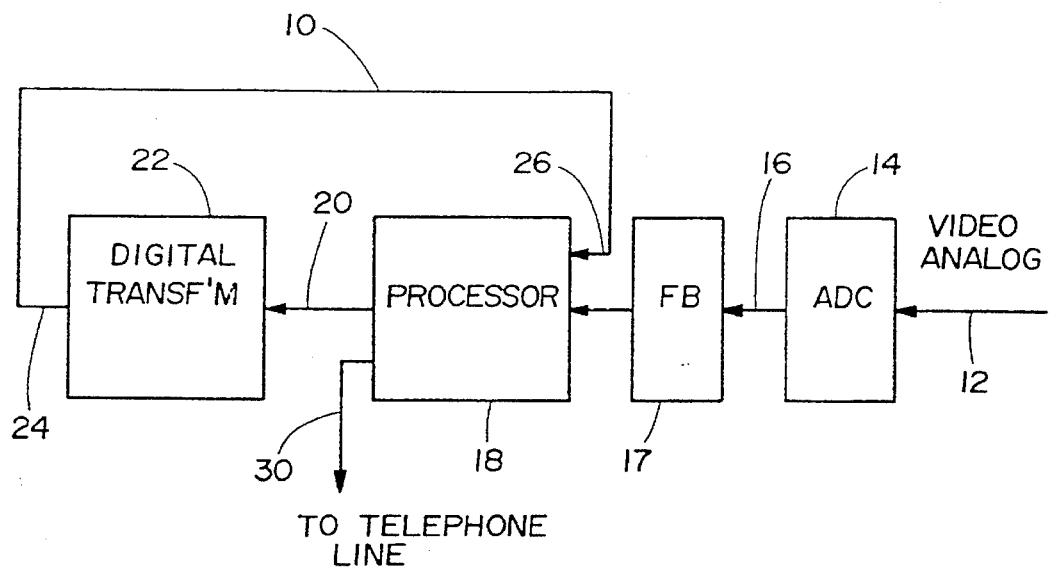
FIG. 1 is a block diagram of a conventional system for processing image data.

Referring to FIG. 1 there is shown a conventional system for processing image data received from a video source in analog form on line 12. The signals on line 12 are converted to digital signals by analog to digital converter 14, outputted on line 16 to a frame buffer 17 and then to a processor 18. The processor transmits the data on line 20 to a digital transformer 22 which modifies the data and returns it back to the processor 18 where it is then sent along line 30 to a telephone line for transmission. The digital transformer 22, which performs a discrete cosine transform on tiles made up of a block of 8 pixels by 8 pixels, inputs and outputs its data in a predefined order. This required ordering of the data is determined by the internal structure of the digital transformer 22. The image data received by the processor 18 from the frame buffer 17 are sent to and received from the digital transformer 22 in tiles of 8 pixels by 8 pixels in the order expected by the digital transformer 22. Each tile of image data from the frame buffer 17 is directed through the digital transformer 22 and further processed by the processor 18 in order to compress the image. Although data is compressed by the transformer 22, the time for compression and subsequent decompression on a receiving end (not shown) would offset any advantage due to increased speed of transmission.

Figure 2:
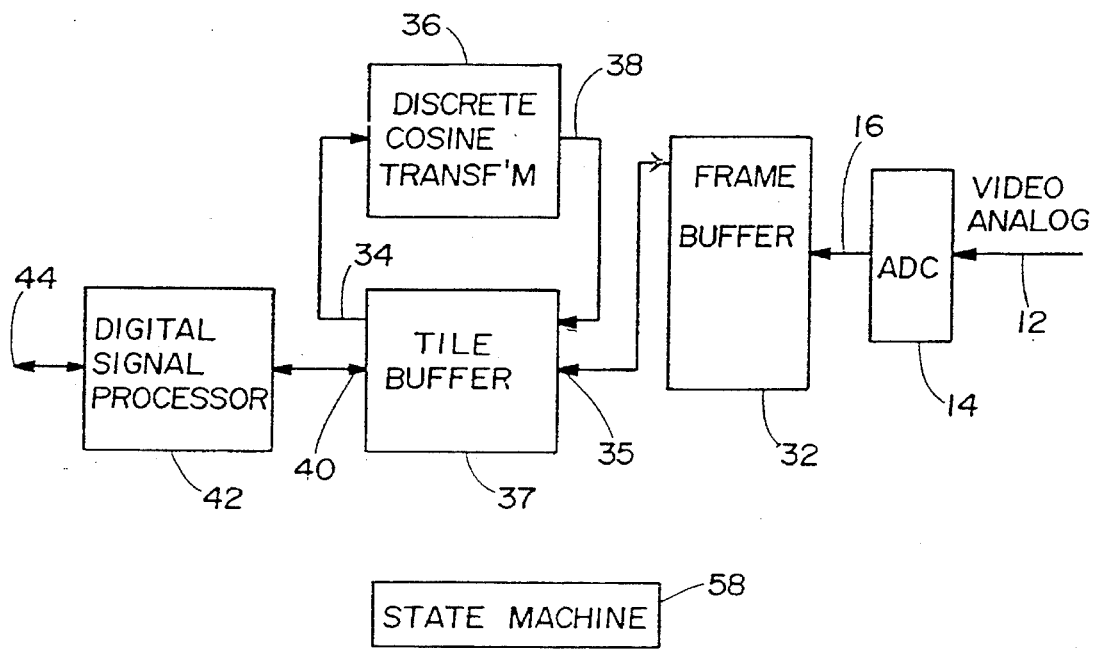
FIG. 2 is a block diagram of a preferred apparatus for processing image data from analog video source such as a television monitor.

Referring to FIG. 2 there is shown a system in accordance with a preferred embodiment of the invention in which analog signals on line 12 are converted to digital signals on line 16 by an analog-to-digital converter 14. The digitized image data from the analog to digital converter 14 is sent on line 16 to a frame buffer 32 in which the image data is temporarily stored or captured. The frame buffer 32 consists of 8 one megabit video dynamic random access memory chips (called "VRAMS") made by Texas Instruments Incorporated which form two image memory units each of 512×512×16 bits capacity. Data in the frame buffer 32 is stored in rows with each block of 8 pixel×8 pixel forming a tile. A first row of tiles ("row 0") is moved into the tile buffer 37 from the frame buffer 32 along line 35 in response to control signals from a state machine 58. The memory 39 of the tile buffer 37 (see FIG. 7) consists of enough high speed static random access memory (SRAM) chips 41 to contain one row of 8 pixel by 8 pixel tiles from the frame buffer 32. The state machine 58 moves the first two tiles in the tile buffer 37 into the digital transformer 36, which in this case is a discrete cosine transform chip manufactured by INMOS in the United Kingdom and sold under part number 1MSA121 (hereinafter referred to as a "DCT"), where they are processed and then transferred back to the tile buffer 37. The state machine 58 presents the individual pixels of each tile to the DCT chip 36 in the order required by the DCT chip 36. In addition, the state machine 58 overwrites each tile in the tile buffer 37 with the resulting DCT coefficients generated by the DCT chip 36. The DCT chip 36 takes 8 pixel×8 pixel tiles, performs a discrete cosine transform, and then outputs the results.

Following the transformation of the first two tiles from the tile buffer 37 through the DCT chip 36, each remaining pair of tiles in the tile buffer 37 is directed through the DCT chip 36 by the state machine 58 until all of the tiles have been transformed and their resulting DCT coefficients are stored back in the tile buffer 37. The DCT coefficients in the tile buffer 37 are then accessed by a digital signal processor (DSP) 42 chip which commences a coefficient to symbol conversion, namely such as Huffman coding, on the data. Other types of conversion are possible. The DSP chip 42 is manufactured by Texas Instruments Incorporated under part number TMS320C25. The resulting compressed data from the DSP 42 is then sent to a communication card 74 and is ultimately sent over a telephone line or stored on a hard disk drive (not shown).

While the DSP chip 42 is performing coefficient to symbol conversion, the state machine 58 begins operation on the second row of tiles (row 1) in the frame buffer 32. It transfers this row of image data to the tile buffer 37 and, once again, runs this data through the DCT chip 36 and deposits the results back in the tile buffer 37 for the DSP 42 to eventually access. Row by row of tiles from the frame buffer 32 are transferred to the tile buffer 37, transformed by the DCT 36, and then directed to the DSP 42 for coefficient to symbol conversion until the entire image, comprised of all 64 rows of tiles, has been compressed. The data movement operations caused by the state machine 58 and the processing by the DSP 42 may occur concurrently so that discrete cosine transformations may occur in parallel with Huffman coding, further increasing the compression speed.

The circuit of FIG. 2 can also receive compressed data on line 44 into the DSP 42 which applies a symbol to coefficient conversion known as reverse Huffman coding. Other types of conversion are also possible. Following operation by the DSP 42, the data is transferred to the tile buffer 37 from which it goes into the DCT 36. The DCT chip 36 is configured to apply an inverse transform and hence decompress the data. The decompressed data is written into the frame buffer 32 from which it can be directed to a desired output.

Figure 7:
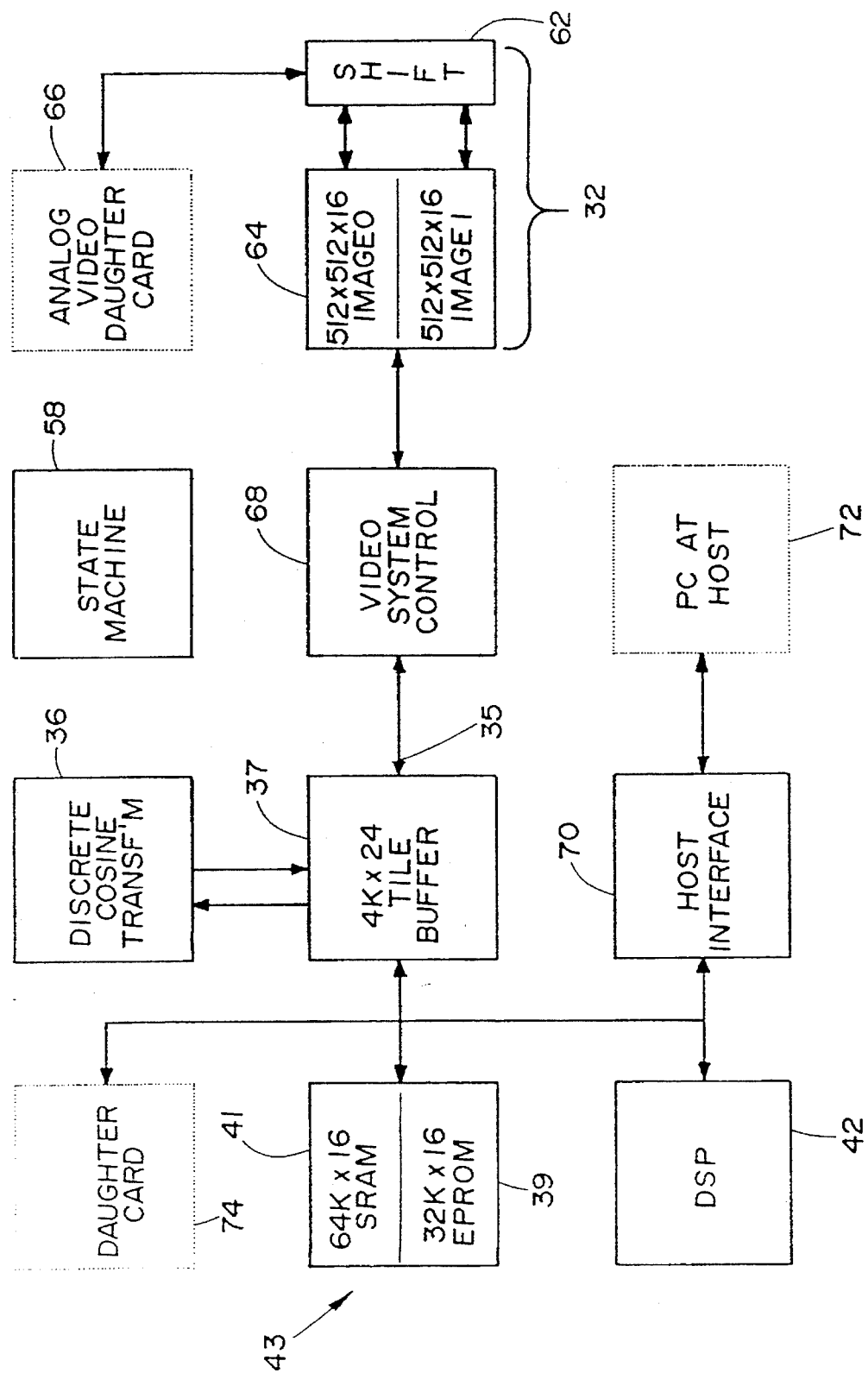
FIG. 7 is a block diagram showing a more detailed system corresponding to that shown in FIGS. 2 and 5 hereof.

Referring to FIG. 7 there is shown a more detailed diagram of the imaging system. Here analog video signals received by a daughter card 66 are digitized and sent to shift register 62 which is incorporated into the frame buffer 32 together with the VRAM chip 64. The frame buffer 32 is controlled by a video system controller chip 68 which refreshes the frame buffer 32 and arbitrates access to the frame buffer 32. The DSP 42 has its own discrete memory 43 consisting of 64 kilobytes of high speed static ram memory 41 and 32 Kilobytes of electrically erasable programmable only memory (EPROM) 39. Output from the DSP is through either a communication daughter card 74 or to a host interface 70 couplable to a host computer 72.

Figures 3A, 3B:
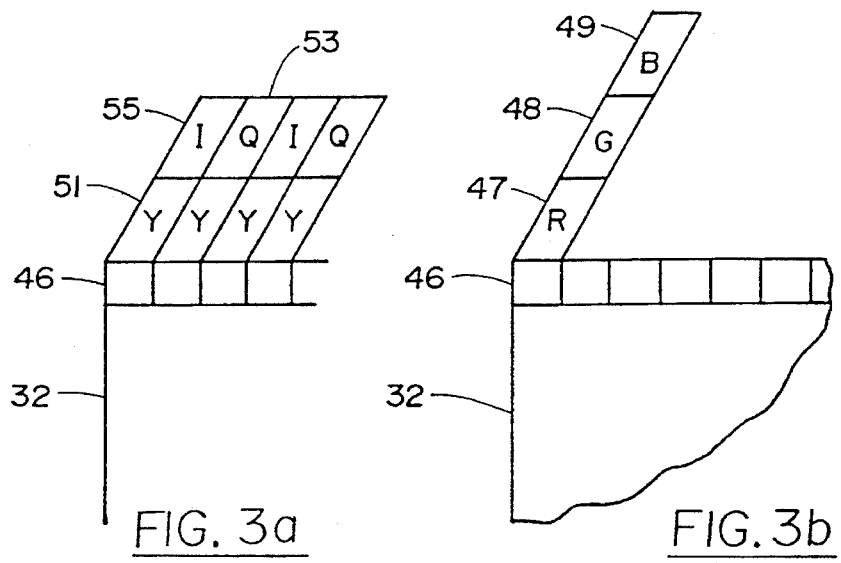
FIG. 3(a) and 3(b) are schematic diagrams showing a portion of a row of pixels in a part of the frame buffer to demonstrate their composition for two different choices of parameters to describe colour and intensity.

Each pixel 46 of frame buffer 32 is shown schematically in FIG. 3(b) as consisting of three parameters such as red 47, green 48 and blue 49. The intensity of each colour component is described by an 8 bit number. Other means of describing the colour and intensity of a pixel may be used. The method employed in the present invention consists of choosing a parameter Y corresponding to intensity and two parameters I and Q which correspond to colour. It is possible with such a choice to reduce the number of bytes required in each pixel from three to two by alternating I and Q in adjacent pixels as shown in FIG. 3(a) without detracting noticeably from the quality of the picture. Thus, each tile consists of an 8 pixel×8 pixel block with each pixel having a number of bits to describe its colour and intensity.

Image data in the frame buffer 32 is stored in a YIQ format. With respect to FIG. 2, when a row of tiles is transferred from the frame buffer 32 to the memory of the tile buffer 37. However, the state machine 58 first sends all of the Y image components of all tiles in the tile buffer 37 through the DCT chip 36, followed by the I then Q components. Once the operation of the DCT chip 36 is complete, the DSP 42 is able to access the DCT coefficients in the tile buffer 37 for all three components Y, I, and Q.

Figure 4:
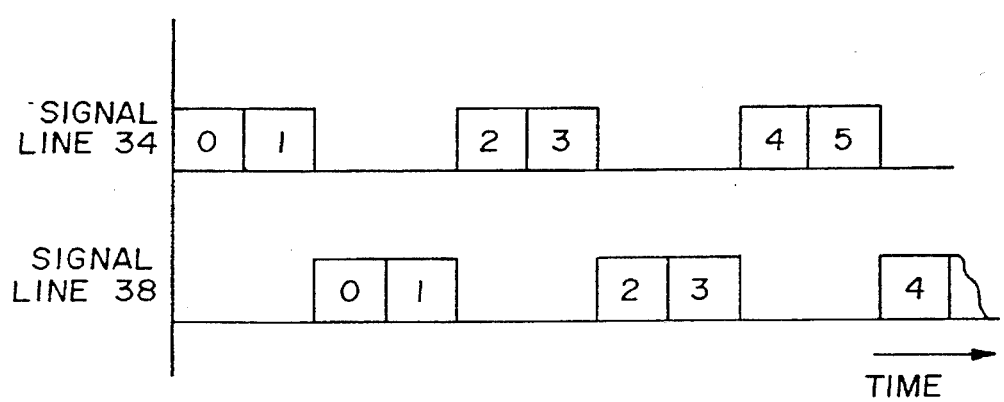
FIG. 4 is a timing diagram showing the movement of tiles into and out of the discrete cosine transform.

To appreciate the timing of transferring tiles FIG. 4 shows that the first two tiles are transferred sequentially to the DCT 36 and are returned to the tile buffer before the next two tiles are extracted from the frame buffer 32 and placed in the tile buffer 37. Thus, there is a delay of two tiles introduced by the return of processed tiles from the DCT 36.

The operation of the state machine 58, implemented with programmable array logic the chips for which are commonly referred to as PAL's, is controlled by the digital signal processor 42. Upon informing the state machine 58 of the required operation, such as a frame buffer 32 to tile buffer 37 transfer or DCT 36 transformation, by depositing a specific control value in a state machine control register 60 (see FIG. 5), the DSP 42 sends a signal to the state machine 58 informing it to "go". The state machine 58 performs the operation requested by the DSP 42 and, upon completion, sends an "I'm done" signal to the DSP 42. While the state machine 58 is performing an operation the DSP 42 is free to do other tasks.

Figure 5:
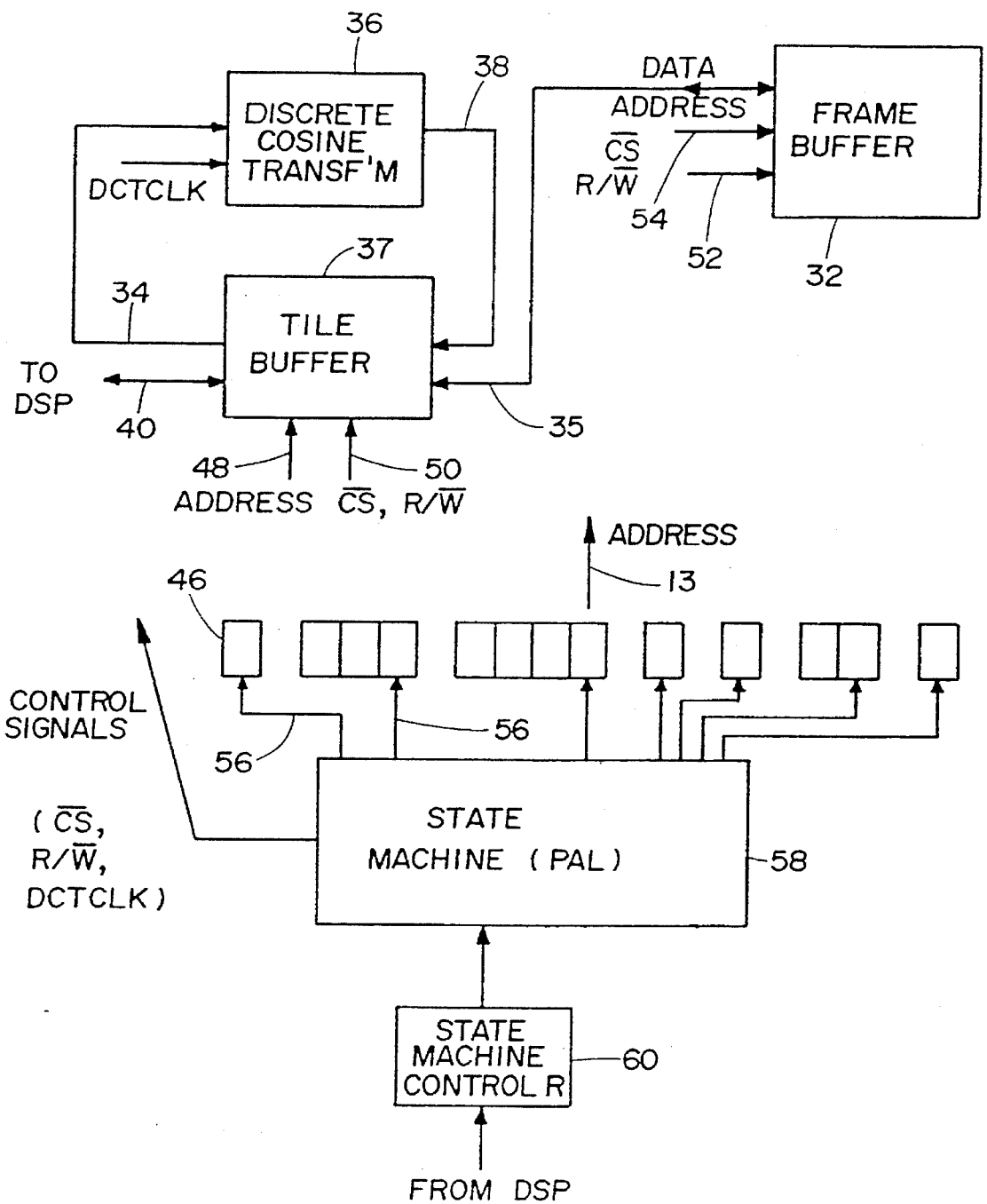
FIG. 5 is a schematic block diagram showing the state machine and its output of address and control signals which govern the flow of data between the frame buffer, the tile buffer and the discrete cosine transform.

When performing any transfer operation, as seen in FIG. 5, the state machine 58 must generate address signals for the tile buffer 37 and frame buffer 32 and control signals for the tile buffer 37, frame buffer 32, and DCT chip 36. The address generated by the state machine 58 originates from a group of counters 46 divided into address fields. Each field of addresses may be independently incremented by the state machine 58. The concatenated address fields form the full address used by both the tile buffer 37 and the frame buffer 32 memories. Individual address fields may define the tile number "t", row number "r", and column number "c" transferred at any given time in a state machine operation. By examining a control register 60 of the state machine 58 and the current address of the address fields, the state machine 58 is able to decide the appropriate 37 next address" for the next data transfer and pulses the appropriate increment signal on selected ones of lines 56 to the counters 46 so that that address is generated. The control signals inform the tile buffer 37, frame buffer 32, and DCT chip 36 when to read and write data. They are generated by the state machine 58 by examining the state machine control register 60 and the current state of the state machine 58.

The state machine addresses, shown in detail in FIG. 6, each consist of 13 bits divided up into four different fields. The fields are write "w", row number "r", tile number "t" and column number "c". Together w, r, t, and c produce an address which points to a single pixel or coefficient within the frame buffer 32 or tile buffer 37. The tile field "t" indicates the current tile which is involved-in a state machine transfer. There are 64 Y tiles and 32 of each of the I and Q tiles contained within a row of tiles. Therefore, 6 bits are required to indicate a unique Y field of a tile and 5 bits to indicate a unique I or Q field. The row field "r" indicates the row, numbered from 0 to 7. The value in the single bit write field is used to determine whether a tile buffer "read" or tile buffer "write" will occur during transfers to and from the DCT 36. Because I image components are stored only in even pixels in the frame buffer and Q image components are stored only in odd pixels in the frame buffer, as shown in FIG. 3(b), the arrangement for the I and Q tile and column fields differ from the Y component's tile and column field arrangement.

The state machine carries out the following five different transfer operations:

(1) Transfer of a row of tiles from the frame buffer 32 to the tile buffer 37.

(2) Transfer of a row of tiles from the tile buffer 37 to the frame buffer 32.

(3) Transfer the Y component of the tiles in the tile buffer through the DCT chip 36 and back into the tile buffer 37.

(4) Transfer of the I component of the tiles in the tile buffer 37 tiles through the DCT chip 37 and back into the tile buffer 37.

(5) Transfer of the Q component of the tiles in the tile buffer 37 through the DCT chip 36 and back into the tile buffer 37.

The address generated by the state machine 58 flows to both the tile and frame buffers 37 and 32, respectively. As an example, when setup by the DSP 42 to perform a frame buffer 32 to tile buffer 37 transfer and told to "go", the state machine's address fields are initially all equal to zero. The address is pointing, therefore, to row 0 and column 0 of tile 0, which is the first pixel in both the frame and tile buffers 32 and 37, respectively. A read signal is sent to the frame buffer 32, a write signal is sent to the tile buffer 37 and the first word of image components is transferred directly from frame buffer 32 to the tile buffer 37.

Immediately following the aforementioned pixel transfer, the state machine 58 examines the current state of the address fields and the type of transfer requested. It uses this information to determine the proper "next address" required and strobes the appropriate increment pulses to generate that address. In this case, increment pulse 0 would be strobed resulting in the column field being increased to 1. The second pixel is then transferred directly from the frame buffer 32 to the tile buffer 37 by the state machine 58 by again strobing the appropriate read and write control signals.

The state machine 58 continually strobes the appropriate increment pulses to generate the required address and the read/write control signals to initiate the frame buffer 32 to tile buffer 37 transfer until all pixels in the selected row of tiles in the frame buffer 32 have been transferred to the tile buffer 37. The full address sent to both the frame buffer 32 and tile buffer 37 is simply incremented by one for each pixel transfer, in a frame buffer 32 to tile buffer 37 transfer, until the state machine 58 detects that the last transfer (the 4095th pixel) has been accomplished. At this time, the state machine 58 sends an "I'm done" signal to the DSP 42 to indicate the completion of the requested operation.

When the state machine 58 is conditioned by the DSP 42 to transfer data to or from the DCT 36 and told to "go", for each DCT chip 36 clock cycle, the state machine 58 must send an expected pixel or coefficient of data to or cause the tile buffer 37 to receive it from the DCT chip 36. The DCT chip 36 requires input and output data to be handled in a strict order. For example, the DCT chip 36 requires data to be presented to it row by row within a give tile. The state machine is able to generate the proper address by examining the type of DCT operation in progress (Y, I, or Q) and the current state of the address field. The address initially points to row and column 0 of tile 0. As data is transferred from the tile buffer 37 to the DCT chip 36, the column address field is first incremented until it reaches a maximum, i.e. 7. For the next transfer the column address field is reset and the row field is incremented. Eventually, when both the column and row address field reach their maximum value, they are reset and the tile field is incremented. Using this technique to generate the address flowing to the tile buffer 37, the DCT chip 36, is able to receive tile input data in the appropriate order. Output data from the DCT chip 35, directed to the tile buffer 37, is stored back in the appropriate tile, column, and row address locations using the same address generation technique. The write field indicates whether a tile buffer to DCT chip or DCT chip 36 to tile buffer 37 data transfer is currently occurring. Once all tiles within the tile buffer 37 have been directed through the DCT chip 36, the state machine 58 sends an "I'm done" signal to the DSP.

It is possible to use adaptive Huffman Coding rather than Huffman Coding. However, in the latter case it would require transferring back transformed data after operation of the DCT into the frame buffer as adaptive Huffman Coding requires that the whole of the intermediate results be looked at.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A method of processing digital image data such as obtained from a television screen for transmission along telephone lines such that the transmitted data can be transformed to produce images in colour, comprising the steps of:

(a) storing a frame consisting of a plurality of tiles of incoming digital image data in a frame buffer (32);

(b) immediately transferring a predetermined number of tiles of said data from said frame buffer (32) to a tile buffer (37);

(c) generating a clock signal;

(d) generating sets of address and control signals in a state machine (58);

(e) applying the clock signal to a digital transformer (36) and applying associated sets of address and control signals to said tile buffer (37) to directly transfer said data in said tile buffer to said digital transformer (36);

(f) transforming the transferred data in said digital transformer;

(g) immediately returning said transformed data to said tile buffer (37) and overwriting corresponding untransformed data in said tile buffer (37) with the transformed data;

(h) repeating steps (c) to (g) until all data in said tile buffer has been transformed and returned;

(i) immediately transferring the transformed data from said tile buffer to a digital signal processor so as to code said transformed data in the tile buffer (37) and compress it;

(j) immediately transferring a further group of tiles of said data in said frame buffer to said tile buffer while the group of previously transformed data in said tile buffer is being transferred to said digital signal processor for coding;

(k) repeating steps (b) and (h) to (j) until all said data in said frame buffer (32) is compressed;

wherein data transfer in steps (b), (g), (i) and (j) is independent. Of said transformer and said digital signal processor.

2. A method according to claim 1, wherein said data from said frame buffer is transferred directly to said tile buffer (37) one row at a time.

3. A method according to claim 2, wherein said coding is Huffman coding.

4. A method according to claim 3, wherein said decompressing step includes performing reverse Huffman Coding on incoming compressed data to code said compressed data and storing said coded data in said tile buffer (37), performing an inverse discrete cosine transform on said compressed data, and then transferring said decompressed data to said frame buffer (32) for temporary storage.

5. A method according to claim 2, wherein said clock signal has a frequency greater than approximately one megahertz.

6. A method according to claim 2, wherein said digital transformer (36) applies a discrete cosine transform.

7. A method according to claim 2, wherein data stored in said frame buffer (32) is in the form of 8 bits of Y intensity data, 8 bits of I colour data and 8 bits of Q colour data, where is a parameter corresponding to intensity and I and O are two parameters each corresponding to colour, and wherein each pixel is defined by Y and I or Y and Q with I and Q alternating along each row of pixels.

8. A method according to claim 2, wherein said coding performed by said processor (42) is Huffman coding.

9. A method according to claim 1, wherein the data transferred from said tile buffer (37) to said transformer (36) is contained in a pair of tiles of said Y, I, or Q data, wherein each of said tiles includes a block having 8 pixels×8 pixels with each pixel being defined by said Y and I or Y and Q data.

10. A method according to claim 9, wherein data in said tile buffer (37) is transferred by transferring two of said tiles at a time, first said Y data in one of said tiles and then said Y data in a next tile, then said I data in said one tile and then I data in said next tile and finally said Q data in said one tile and then said Q data in said next tile until all of said tiles in said tile buffer (37) have been transferred from and returned to said tile buffer (37).

11. A method of processing digital image data such as obtained from a television screen for transmission along telephone lines such that the transmitted data can be restored to produce images in colour, comprising a compressing step which includes:

(a) storing tiles of said digital data in a frame buffer (32) wherein each of said tiles is in the form of a matrix of 8 columns of pixels and 8 rows of pixels, with each pixel having bits to define its colour and intensity;

(b) immediately transferring a row of said tiles of said digital data directly from said frame buffer (32) to a tile buffer (37);

(c) digitally transforming said tiles of said data by immediately transferring them to a discrete cosine transformer (36) and then immediately transferring them back again to said tile buffer (37) where they overwrite the untransformed data stored in said tile buffer (37);

(d) immediately transferring said transformed data from said tile buffer (37) to a digital signal processor (42) where it is coded to complete compression at the same time fetching a new row of uncompressed data from said frame buffer (32) and immediately transferring it to said tile buffer (37);

(e) repeating steps (b), (c), and (d) until all of said tiles of said data in said frame buffer (32) have been compressed;

and a decompressing step which includes:

(f) performing decompression on previously compressed digital data and storing said decompressed data in said tile buffer (37);

(g) immediately transferring said data after being decompressed from said tile buffer (37) to said frame buffer (32);

(h) wherein data transfer in steps (b), (c), (d) and (g) is independent of said discrete cosine transformer and said digital signal processor.

12. A method according to claim 11, wherein said compressing step includes:
   (a) generating a clock signal;
   (b) generating sets of address and control signals in a state machine (58); and
   (c) applying the clock signal to a digital transformer (36) and applying each set of address and control signals to said tile buffer (37) to directly transfer said data in said tile buffer (37) to said digital transformer (36).

13. A method according to claim 12, wherein said state machine (58) generates addresses by initializing counters corresponding to each address field and concatenating the fields to provide an address.

14. A method according to claim 12, wherein said data is transferred from said frame buffer (64) to said tile buffer (37) by rows, one row of said tiles at a time wherein adjacent tiles in each row of said tiles having a contiguous address space and performing a discrete cosine transform, on each of said tiles, transferring said transformed row of tiles to a processor (42) and operating on each transformed tile in said row of tiles in succession to perform coefficient to symbol conversion.

15. An apparatus for processing digital image data such as obtained from a television or video screen, comprising:
   (a) a frame buffer (32) for storing frames of data;
   (b) means for storing pixels of said data in said frame buffer (32) so that the pixels for a matrix of rows and columns in address space;
   (c) a tile buffer (37) connected to said frame buffer (32) so that tiles of data stored in said frame buffer (32) are transferable to said tile buffer (37) are transferable to said frame buffer (*32), wherein a tile is formed by a sub-matrix of n×n pixels where the number of rows and columns in said frame buffer (32) is a multiple of "n";
   (d) a transformer having an untransformed input coupled to a digital signal processor connected end of said tile buffer and transformed end of said transformer coupled to frame buffer connected end of said tile buffer (37), said transformer operative to transform data from said tile buffer (37) that has been received from said frame buffer (32) and to inversely transform data from said tile buffer (37) that has been received from said signal processor (42) and to transfer transformed and untransformed data out while receiving untransformed and transformed data, respectively, in for temporary storage;
   (e) a digital signal processor connected to said tile buffer operative to code data received from said tile buffer and reverse code compressed data received from an external transmitting source and direct the reverse coded data to said tile buffer for inversely transforming the reverse coded data; and
   (f) a state machine coupled to said frame buffer (32), said tile buffer (37) and said transformer (36) and operative to generate sets of address and control signals so as to cause data in said frame buffer (32) to be transferred immediately and directly row by row to or from said tile buffer (37) and to cause tile transfers immediately and directly between said tile buffer (37) and said transformer (36).

16. Apparatus according to claim 15, wherein said storing means is a video dynamic random access memory unit.

17. Apparatus according to claim 15, wherein tiles are transferred to said tile buffer from said frame buffer a row of tiles at a time and pairs of tiles adjacent in address space from said tile buffer are sent to said transformer and then returned to said tile buffer after transformation.

18. Apparatus according to claim 15, wherein said processor performs Huffman coding and said transformer performs discrete cosine transforming.

19. Apparatus according to claim 15, wherein the value of "n" is 8 and wherein each pixel is characterized by a word defining its colour and one defining its intensity.

20. A method of processing image data from a video screen, comprising the step of compressing the data including:
   (a) digitizing said image data;
   (b) storing said digitized data in a frame buffer in the form of rows and columns of tiles, wherein each of said tiles is composed of a matrix of 8 pixels by 8 pixels, each of said pixels is described by words corresponding to both colour and intensity, and adjacent tiles in a row are contiguous in address space;
   (c) extracting a first row of said tiles from said frame buffer (64) and immediately transferring them directly to a tile buffer (37);
   (d) immediately transferring tiles in said tile buffer to a digital transformer and transforming them and then immediately returning them to said tile buffer;
   (e) transferring the transformed tiles in said tile buffer to a digital signal processor and applying Huffman coding to them;
   (f) extracting, immediately transferring to said tile buffer and compressing sequentially, one row at a time, subsequent rows of said tiles in said frame buffer (64) concurrently with completing compression on a previous row until all of said tiles have been extracted and compressed; and
   (g) transferring each row of said compressed data to a communication output interface while at the same time fetching from said frame buffer (64) a next row of uncompressed data and immediately transferring it to said tile buffer;
   and the step of decompressing the data including:
   (h) applying reverse Huffman coding to a row of incoming compressed image data so as to reverse code said data and immediately storing the reverse coded data in said tile buffer (37);
   (i) immediately transferring the reverse coded data in said tile buffer to said discrete cosine transformer and performing an inverse discrete cosine transform on said reverse coded data stored in said tile buffer (37) so as to produce inversely transformed, reverse coded data and immediately returning said inversely transformed, reverse coded data to said tile buffer (37); and
   (j) immediately transferring said row of inversely transformed, reverse coded data from said tile buffer (37) to said frame buffer (64) while at the same time immediately transferring from said digital signal processor a next row of compressed data to said tile buffer (37);
   wherein the data transfers in Steps (c), (d), (f), (g), (h) and (i) is done independently of said transformer and said digital signal processor.

* * * * *